(12) United States Patent
Sherman et al.

(10) Patent No.: US 6,725,318 B1
(45) Date of Patent: Apr. 20, 2004

(54) AUTOMATED SELECTION BETWEEN A USB AND PS/2 INTERFACE FOR CONNECTING A KEYBOARD TO A COMPUTER

(75) Inventors: Nathan C. Sherman, Sammamish, WA (US); Keith Mullins, Kent, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/515,563

(22) Filed: Feb. 29, 2000

(51) Int. Cl.[7] ............................................. G06F 13/36
(52) U.S. Cl. .............................. 710/313; 710/2; 710/7; 710/8; 710/36; 710/62; 710/63; 710/67; 710/304
(58) Field of Search ............................. 710/2, 7, 8, 36, 710/62, 63, 67, 304, 313

(56) References Cited

U.S. PATENT DOCUMENTS

| | | | | |
|---|---|---|---|---|
| 5,835,791 A | * | 11/1998 | Goff et al. ..................... | 710/62 |
| 6,000,042 A | * | 12/1999 | Henrie ......................... | 714/40 |
| 6,219,229 B1 | * | 4/2001 | Lee ............................. | 361/683 |
| 6,269,288 B1 | * | 7/2001 | Smith .......................... | 700/295 |
| 6,442,734 B1 | | 8/2002 | Hanson et al. ................. | 716/4 |
| 6,460,094 B1 | | 10/2002 | Hanson et al. ................. | 710/8 |

* cited by examiner

Primary Examiner—Jeffrey Gaffin
Assistant Examiner—Mohammad O. Farooq
(74) Attorney, Agent, or Firm—Ronald M. Anderson

(57) ABSTRACT

A keyboard selectively operable to convey data to and from a host or personal computer (PC) through a universal serial bus (USB) port and/or a personal system/2 (PS/2) port. The keyboard is preferably connected to both the USB port and PS/2 port on the host or PC, if available. Preference is given to communicating data from the keyboard to the host or PC through the PS/2 port. However, if the PS/2 port is unavailable, not connected, or inoperative, the keyboard data are communicated to the host or PC through the USB port (assuming that it is available, operative, and connected). As soon as the PS/2 port on the host or PC is again connected to the keyboard, such data will again be communicated through the PS/2 port. In addition, the keyboard includes auxiliary USB ports to which USB-capable peripheral devices can be connected. USB data can then be communicated between the PC and the USB-capable peripheral devices via the keyboard and its connection to the USB port on the host or PC. Power supplied from the PS/2 port on the host or PC is monitored to determine whether that port is connected to the keyboard, and in response, to cause data arising from the user actuating keys on the keyboard to be supplied to the host or PC through the PS/2 port.

36 Claims, 5 Drawing Sheets

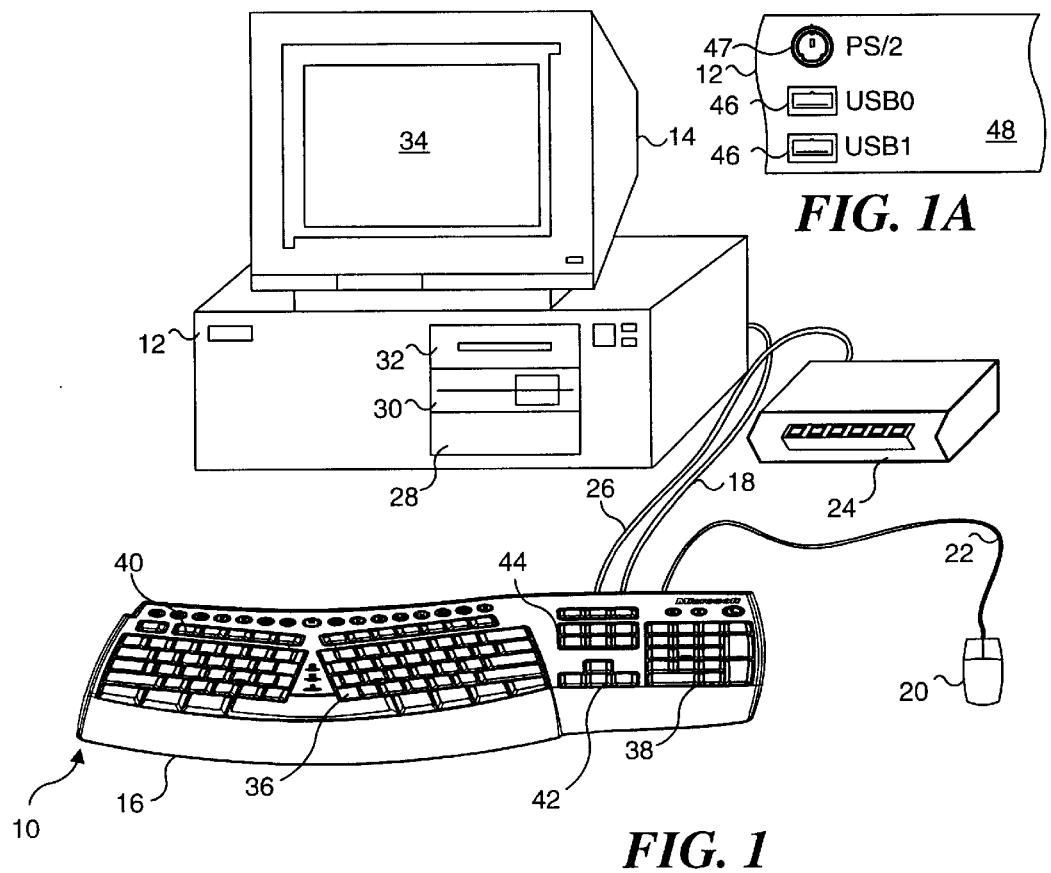
FIG. 1A
FIG. 1
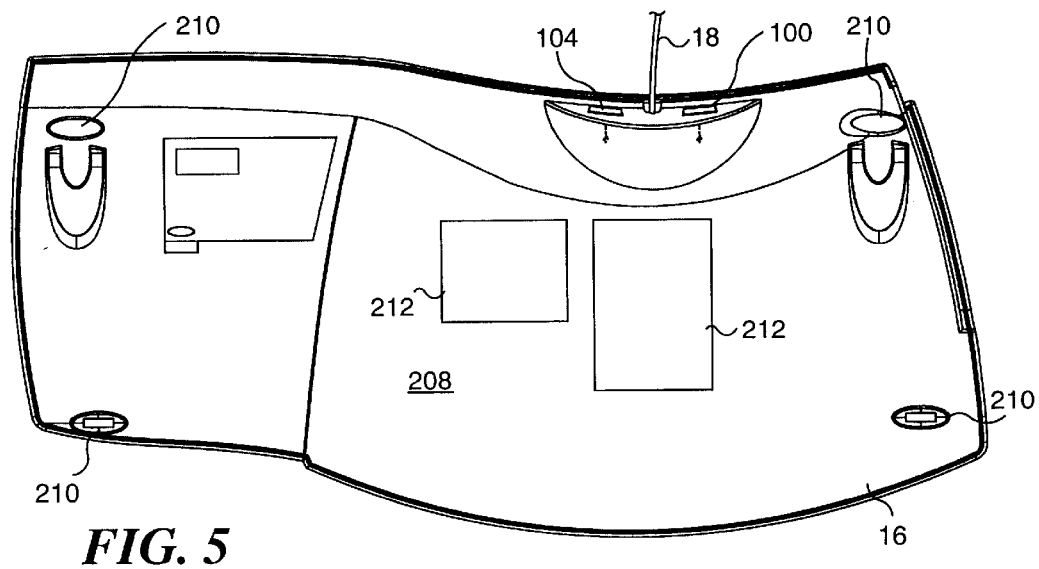
FIG. 5

AUTOMATED SELECTION BETWEEN A USB AND PS/2 INTERFACE FOR CONNECTING A KEYBOARD TO A COMPUTER

FIELD OF THE INVENTION

This invention generally relates to an interface for coupling a user input device to a host, and more specifically, to an interface that selectively interfaces to either a universal serial bus (USB) port or a personal system/2 (PS/2) port on a host or other computing device.

BACKGROUND OF THE INVENTION

Provision of USB ports on personal computers (PCs) is rapidly becoming an important feature, and the increasing availability of USB-capable peripheral devices may eventually eliminate the need to provide conventional RS-232 serial ports and parallel ports. While there are many advantages to using a peripheral device that is able to connect to a computer through the USB port, one of the more significant is that several USB-enabled peripheral devices can be daisy chained together and connected to only a single USB port on a PC. For example, a USB mouse can be connected to a USB port on a monitor, and the monitor in turn, can be connected to a USB port on a PC. Theoretically, up to 127 USB-enabled peripherals can be chained together. Another important advantage of a USB port is that the connection (and disconnection) of USB peripherals to the port will be recognized by a USB-compliant operating system, such as Microsoft Corporation's WINDOWS 98 or WINDOWS 2000 operating systems, without the need to reboot the computer. Thus, it is possible to connect a USB-capable digital camera to a USB port on a PC while the PC is operating, in order to download digital photographs for storage, touchup, and/or printing with the PC, and the connection to the camera will be recognized and configured by the operating system without requiring the PC to be rebooted.

To enable connection of additional USB peripheral devices that may not include any USB port for daisy-chaining to other USB devices such as a mouse, speakers, a modem, or a digital camera, a USB hub is required. In some cases, a powered USB hub may be useful to provide the electrical power needed to energize a number of USB-capable peripheral devices. However, if only a few low-power USB peripheral devices are used, it may be preferable for at least one of the USB peripheral devices to include additional USB ports to avoid the need for a stand-alone USB hub. The only significant problem with providing a plurality of USB ports for this purpose on a USB-capable peripheral device may be the limitation on available power, since the power available for all of the USB devices connected to a PC in this manner is only that relatively limited power supplied through a USB port on the PC.

Compliance with the USB specification by peripheral device and computer manufacturers has not been achieved without problems. Early USB peripheral devices have not always functioned as expected, in part because they did not fully conform to the USB specification. Other problems have arisen due to delays in properly implementing all of the software and hardware support on a PC required for a particular USB device to work properly. For instance, USB-capable keyboards may not be properly recognized and enabled during boot up of a computer unless the basic input/output system (BIOS) on the computer motherboard is fully compatible with and supportive of the USB specification. Failure of the BIOS to properly recognize a USB-capable keyboard will prevent the keyboard from being used for input and control of the PC until a USB-compliant operating system is running on the computer. As a result, user actuation of keys on the keyboard that may be required to interact with the BIOS during the boot up process will not be recognized by the operating system. This problem is significant, because in order to access and change BIOS settings that are stored in the non-volatile memory of a PC by running a BIOS setup routine, a user must typically enter a specific key combination during the boot up process. However, if the BIOS installed on the PC is not fully USB compliant, a USB keyboard may not be operational during the boot up of the PC, precluding a user from accessing the BIOS parameters with the BIOS setup routine. If the BIOS setup routine cannot be accessed, problems can arise in which the USB-compliant operating system cannot be loaded.

To avoid problems of this type, it might seem preferable to supply keyboards that are designed to interface with a computer only through a PS/2 port. PS/2 keyboards are recognized and supported by virtually all operating systems commonly used on a PC, and more importantly, by most BIOS systems currently in use. However, there is a trend to simplify PCs by eliminating PS/2, parallel, and serial ports. In such PCs, the BIOS should be fully USB compatible, and thus capable of properly initializing and enabling USB-compliant keyboards, so that all functions on the USB-capable keyboard are accessible and usable—even during boot-up of the PC. Thus, there will be a growing market for keyboards that are designed to connect to a PC through a USB port on the computer.

Even if a USB-capable keyboard is not properly initialized or supported by the BIOS of an older computer during boot up, there are clear advantages in providing a USB-capable keyboard that can also function as a USB hub when the keyboard is connected to the USB port of a PC, since many new peripheral devices are of the USB-compliant type. Thus, it is desirable to provide keyboards that can work properly with both older PCs that are not fully USB compliant via the PS/2 port, and newer PCs that are fully USB compliant, via the USB port. In addition, keyboards should provide at least one or more auxiliary USB ports, so that additional USB peripheral devices can be coupled to a USB port (if available) on the PC through any such USB ports on the keyboard. Furthermore, such a keyboard should be able to recognize whether it is connected to a PS/2 or USB port on a host or PC and be able to give preference to one of the ports, if both are available. Also, even if the keyboard is connected to the PS/2 port on the PC for input of keyboard data, it should be capable of serving as a USB hub for connection of USB-capable peripheral devices through the connection of the keyboard to a USB port (if available) on the PC. Currently, it does not appear that these functions are available on any prior art keyboards.

SUMMARY OF THE INVENTION

In accord with the present invention, a user input device is defined that is adapted to selectively couple and communicate user input data through at least one of a USB port and an alternative port of a host. The user input device includes at least one data switch capable of being activated by a user to determine data that are transmitted to a host. A power sense circuit determines whether electrical power is being supplied to the user input device from the alternative port of a host and produces a signal indicative of the source of power. A state switch is coupled to the power sense circuit and to the one or more data switches. The state switch receives the signal produced by the power sense circuit, and in response to the signal indicating that the alternative port is supplying electrical power, enables the host to receive data transmitted from the one or more data switches through the alternative port. Otherwise, the state switch enables the host to receive data transmitted from the one or more data switches through the USB port.

Also preferably included is a USB hub circuit having at least one auxiliary USB port adapted to connect to a USB peripheral device. This auxiliary USB port is then able to transfer data between the USB peripheral device and the USB port of the host device.

In a preferred embodiment of the invention, the alternative port comprises a PS/2 port. Also, the at least one data switch comprises a plurality of alphanumeric keys so that the user input device comprises a USB-capable keyboard. Included in this preferred embodiment is signal conditioning circuitry that conditions data signals and power signals.

The alternative port, which is a PS/2 port in the embodiment disclosed below, has priority over the USB port. Thus, the state switch will always employ the PS/2 port for exchanging data, if the signal produced by the power sense circuit indicates that the PS/2 port is providing electrical current to the user input device. If the host has previously been receiving data transmitted from the at least one data switch through the USB port, upon detecting a change, in which electrical power is being supplied from the PS/2 port of the host to the user input device, the signal produced by the power sense circuit will change. This change will cause the state switch to stop the host from receiving the data from the one or more data switches through the USB port, and instead enable the host to receive the data through the PS/2 port.

If the host has been receiving data transmitted from the one or more data switches through the PS/2 port, upon detecting a change in which electrical power is no longer available from the PS/2 port of the host, the signal produced by the power sense circuit changes. This change will cause the state switch to stop the host from receiving the data from the one or more data switches through the PS/2 port, and instead enable the host to receive the data through the USB port.

Preferably also included is a data format circuit that is coupled to the at least one data switch and to the state switch. The data format circuit formats the data determined by the one or more data switches for input to the PS/2 port if the state switch has enabled the data to be transmitted to the PS/2 port of the host. Otherwise, the data format circuit formats the data for input to the USB port of the host.

A cable coupled at one end to the data format circuit is preferably included. At an opposite end, the cable includes a USB port connector adapted to connect to the USB port on the host and a PS/2 port connector that is adapted to couple to the PS/2 port on the host.

Another aspect of the present invention is directed to a method for enabling a user input device to be selectively coupled to communicate data signals produced as a result of user interaction with the user input device with either a USB port on a host or an alternative port on the host. The method includes steps that are generally consistent with the functions of the elements of the user input device discussed above.

BRIEF DESCRIPTION OF THE DRAWINGS FIGURES

The foregoing aspects and many of the attendant advantages of this invention will become more readily appreciated as the same becomes better understood by reference to the following detailed description, when taken in conjunction with the accompanying drawings, wherein:

FIG. 1 is a schematic diagram of a PC, a USB modem, and a preferred embodiment of a keyboard in which the present invention is implemented;

FIG. 1A is an elevational view of a portion of a back panel of the PC in FIG. 1, showing a PS/2 port and two USB ports;

FIG. 5 is a bottom plan view of the keyboard in FIG. 1.

DESCRIPTION OF THE PREFERRED EMBODIMENT

Figure 2A:
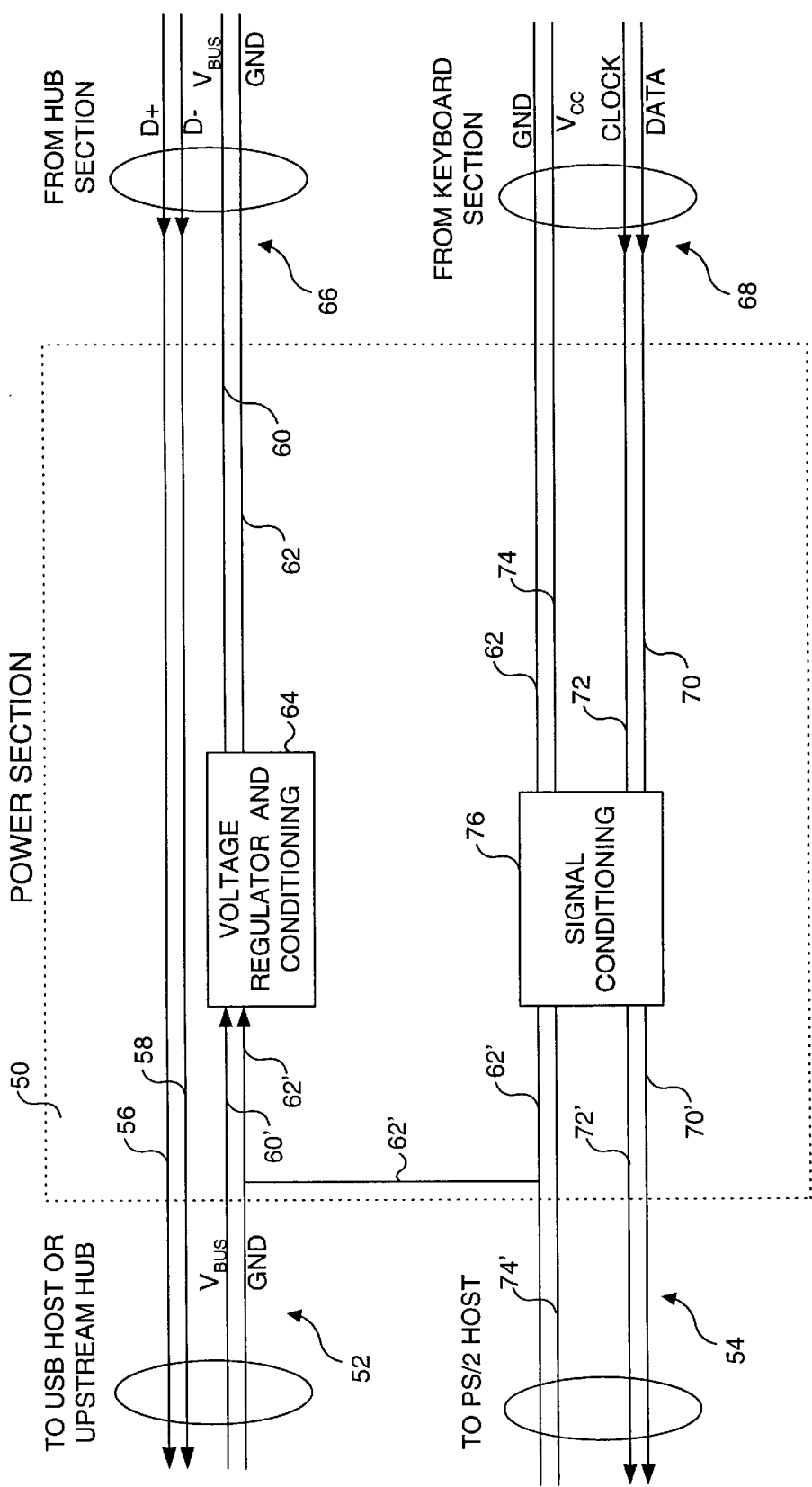
FIG. 2A is a schematic block diagram of a power section of the keyboard shown in FIG. 1.

With reference to FIG. 1, a personal computer system 10 is illustrated that includes a generally conventional computer chassis 12 and a monitor 14, with a display screen 34. While not shown, computer chassis 12 internally includes a processor and other components that are well known to those of ordinary skill in the art for use in implementing a personal computing system. Processor chassis 12 is generally conventional and may include a hard drive 28 and floppy drives 30 and 32.

However, it should be stressed that the present invention is not in any way limited to use with a personal computer of the type shown in FIG. 1, but can also be used with almost any other type of computing device and/or computing network that employs a keyboard for input of user information and/or for control of functions implemented by the computing device. For example, the present invention would also be useable with laptop computers and other portable computing devices, work stations, servers, and other types of systems having a keyboard for user input. For this reason, the term "host" is generically applied to all such systems in the claims that follow and it will be understood, that for purposes of this disclosure, the term "PC" is only one type of host with which the present invention is useable.

In the embodiment illustrated in FIGS. 1 and 5, it will be noted that a keyboard 16 is of the split ergonomic type intended to minimize Carpal Tunnel Syndrome and other types of repetitive stress injuries. By providing a split keyboard with the keys disposed in two clusters about an inverted "V-shaped" center, the user's hands and wrists can be positioned at a more comfortable and natural angle while using the keyboard. However, again, it must be stressed that the present invention is not limited to an ergonomic keyboard, but also can be used in many other types of user input devices employed for providing user input and control of a computing device and/or system.

Keyboard 16 is connected to processor chassis 12 by a cable 18, details of which are described below. Further details of keyboard 16 are illustrated in FIG. 5. This Figure shows an auxiliary USB port 100 and an auxiliary USB port 104 disposed toward the rear, on an underside 208 of keyboard 16. USB-capable peripheral devices can be connected to either of these auxiliary USB ports for transmission of USB data to a USB port 46 on the rear of processor chassis 12 (shown in FIG. 1A). In the example of FIG. 1, a mouse 20 is connected to one of the two auxiliary USB ports on keyboard 16 through a cable 22 that includes a USB connector (not shown). Similarly, a modem 24 is connected to the other USB port on keyboard 16 via a lead 26, which also terminates in a USB connector (not shown).

FIG. 1A shows a portion of a rear panel 48 of processor chassis 12 that includes two conventional USB ports 46 and a conventional PS/2 port 47. As noted above in the Background of the Invention, some older PCs may be provided with a BIOS that is not fully USB compliant, and therefore unable to support input of USB data from keyboard 16 during the boot up of computer system 10. In such cases, keyboard 16 should preferably be connected to PS/2 port 47 and to one of USB ports 46. By connecting the keyboard to PS/2 port 47, a user is ensured that the keyboard will be recognized during boot up so that changes and modifications to the BIOS parameters can be accomplished by using the keyboard to initiate and control the BIOS setup routine at boot up. Furthermore, by connecting keyboard 16 to one of USB ports 46, any peripheral devices connected to auxiliary USB ports 214 and 216 on keyboard 16 will be able to communicate to the PC through USB port 46 to which the keyboard is connected via cable 18. In this manner, keyboard 16 will be able to serve as a USB hub, enabling up to two USB peripheral devices to be connected through the keyboard to one of USB ports 46 on the PC.

It is also contemplated that more or less than two auxiliary USB ports (like auxiliary USB ports 214 and 216) might be provided on a keyboard in accord with the present invention, depending upon the internal circuitry of the keyboard, as will be apparent from the further disclosure. Practical limitations to the number of auxiliary USB ports provided on keyboard 16 may be the available power required to energize the USB peripheral devices connected to the auxiliary USB ports and the necessary space needed to mount the USB auxiliary ports on the keyboard. However, it is also contemplated that the present invention can alternatively be implemented as a self-powered keyboard, which will provide substantially more power to USB-capable peripheral devices that are connected to the USB auxiliary ports of the keyboard than is possible with a keyboard that receives electrical power only from the USB port of the PC.

Keyboard 16 includes keys that are generally conventional on a split keyboard, including conventional alphakeys 36 as are typically found on a QWERTY keyboard, a numeric keypad 38, function keys 40, cursor control keys 42, and display control keys 44.

As shown in FIG. 5, underside 208 includes four feet 210 disposed adjacent corners of the keyboard and instruction panels 212 warning of the possible injury that can arise due to lack of ergonomic use of the keyboard such as improper work surface, angle, and disposition of the user's hands and wrists.

In some cases, keyboard 16 might be used in connection with a PC that does not include a USB port. In this case, USB ports 214 and 216 would be of course not be operative since they would not be connected to either of USB ports 16 on the PC. However, keyboard 16 can still operate for user input of data and for control of applications by connection to PS/2 port 47 (in FIG. 1A), even the USB functionality of the keyboard is not available.

Certain newer PCs, which are referred to as "legacy free," do not include serial ports or parallel ports, and also may omit PS/2 port 47. Such PCs are designed to be used with only USB peripheral devices, including keyboards that are USB capable. When used with such a host, keyboard 16 can only be connected through cable 18 to one of the USB ports on the PC, since the PS/2 port is not available. Furthermore, it will be apparent that the BIOS on such a legacy free PC will be fully compliant with the USB standard and capable of initiating and supporting the USB keyboard, enabling the USB keyboard to be fully functional during the boot up of the PC. Since keyboard 16 may be connected to either a USB port or a PS/2 port or both on a PC, it must be capable of sensing the ports to which it is connected and operating appropriately for each different condition. If keyboard 16 is connected to both a PS/2 port and a USB port on a PC, it will preferentially use the PS/2 port for conveying data between the keyboard and the PC (i.e., data arising from the actuation of the keys on the keyboard by a user) and use the USB port of the host for conveying data between the host and any devices connected to the auxiliary USB ports of the keyboard. If the PS/2 port should become disconnected, inoperative, or otherwise unavailable, keyboard 16 will then revert to using the USB port (if connected and available) for conveying the data between the keyboard and the PC. However, if the PS/2 port is reconnected or become operative, it will again be the preferred the data path for communication of the keyboard data to the PC and the keyboard will revert to using the PS/2 port for conveying data between the keyboard and the PC and the keyboard will revert to using the PS/2 port for conveying data between the keyboard and the PC.

Figure 3:
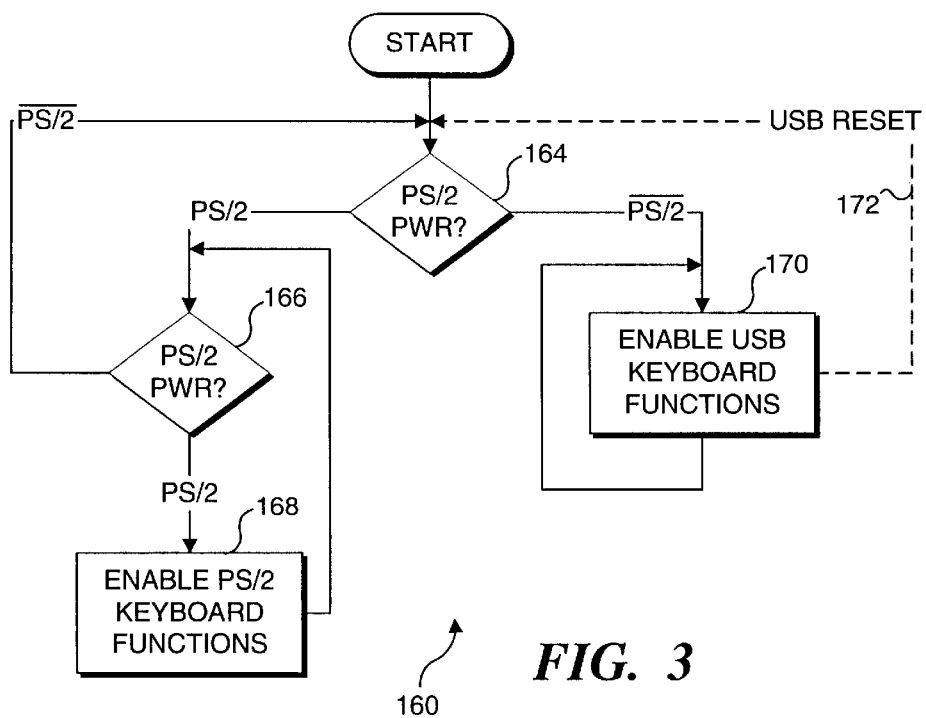
FIG. 3 is a flow chart illustrating the logic implemented in determining whether the keyboard communicates data related to the keyboard to a PC through a USB port or a PS/2 port of the PC.

To determine whether the keyboard is connected to the PS/2 port on the PC, the source of power supplied to the keyboard through cable 18 is monitored. If power is being supplied from the PS/2 port, this condition will be detected by the keyboard. A flow chart 160 in FIG. 3 illustrates the logic employed for selectively controlling the port through which keyboard 16 communicates with the PC. From a start block, a decision block 164 determines if power is being supplied from the PS/2 port of the PC to the keyboard. If so, a decision block 166 repeats this check. If the PS/2 port of the PC is providing electrical power to the keyboard, a block 168 enables the PS/2 functions of the keyboard, including the formatting of data conveyed to the PC in a PS/2 data format suitable for transmission through the PS/2 port on the PC. This state is maintained until decision block 166 detects that the keyboard is no longer being supplied power from the PS/2 port on the PC. Should this change in state occur, the logic loops back to decision block 164, and assuming that this decision block also determines that power is not being provided the keyboard through the PS/2 port of the PC, a block 170 causes the keyboard to enable the USB keyboard functions of the keyboard, which include formatting data transmitted to the PC from the keyboard in response to the user actuating any keys, in USB format. This state continues until a reset of the USB circuitry within keyboard 16 occurs, as indicated by a dashed line 172. One cause of such a USB reset that is most pertinent to the present invention is the application of electrical power from the PS/2 port on the PC to the keyboard. When PS/2 power is applied, gates 114 and 116 will cause the voltage on Vbus 112 to be removed from resistor 134, which will appear to USB Keyboard IC 132 as a USB reset, and at the same time will appear to the Hub IC as a disconnect signal for the USB Keyboard IC. At any time that a USB reset occurs, decision block 164 determines whether power is available from the PS/2 port on the PC, and based upon the result of that determination, proceeds either to decision block 166 or to block 170.

As an alternative to continually looping from block 168 back through decision block 166, it is also contemplated that the falling edge of the PS/2 power signal, which occurs when the PS/2 power connection is disconnected, could be used to initiate an interrupt that would lead to block 170, to enable USB keyboard functions. In a similar fashion, a rising edge interrupt on the PS/2 power signal could be used to switch out of the USB keyboard data communication mode. Clearly, if the USB port is not available or for some other reason, the keyboard is not connected to the USB port interruption of power supplied to the keyboard from the PS/2 port on the PC will cause the keyboard to become inoperative. Similarly, in the event that the USB port on a computer is either unavailable or if the keyboard is not connected to the USB port, it cannot be used should the connection to PS/2 port on the computer be interrupted, and the keyboard will become inoperative. The following Table summarizes the various conditions and indicates the port through which the keyboard data are conveyed to the PC.

| Scenario | PS/2 Port Available | USB Port Available | BIOS Supports USB Keyboard/Hubs Properly | OS Supports USB | Keyboard Works with BIOS/Port? |
|---|---|---|---|---|---|
| 1 | Yes | No | N/A | No | Yes, as PS/2 |
| 2 | Yes | No | NIA | Yes | Yes, as PS/2 |
| 3 | No | Yes | No | No | No |
| 4 | No | Yes | No | Yes | No |
| 5 | No | Yes | Yes | No | Yes, as USB |
| 6 | No | Yes | Yes | Yes | Yes, as USB |
| 7 | Yes | Yes | No | No | Yes, as PS/2 |
| 8 | Yes | Yes | No | Yes | Yes, as PS/2 |
| 9 | Yes | Yes | Yes | No | Yes, as PS/2 |
| 10 | Yes | Yes | Yes | Yes | Yes, as PS/2 |

It will thus be apparent from the preceding that keyboard 16 gives preference to communicating keyboard related data with the PC through the PS/2 port and only uses the USB port for that purpose if the USB port is available, operative, and the keyboard is connected to it, AND only when the PS/2 port is unavailable, disconnected, or inoperative to receive data from the keyboard.

Figure 4A:
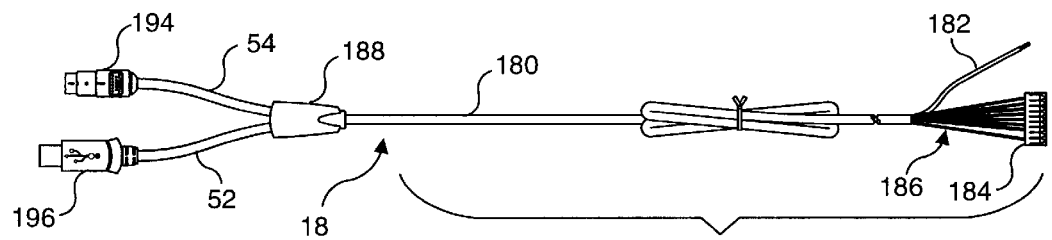
FIG. 4A is a plan view of a cable employed to connect the keyboard to either or both of the USB port and the PS/2 port of a PC.
Figure 4B:
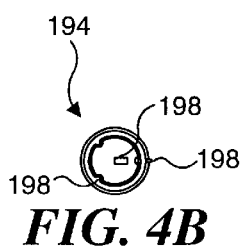
FIG. 4B is an end elevation view of a PS/2 connector on the cable of FIG. 4A.
Figure 4C:
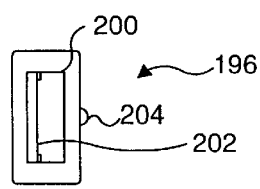
FIG. 4C is an end elevation view of a USB connector on the cable of FIG. 4A.
Figure 4D:
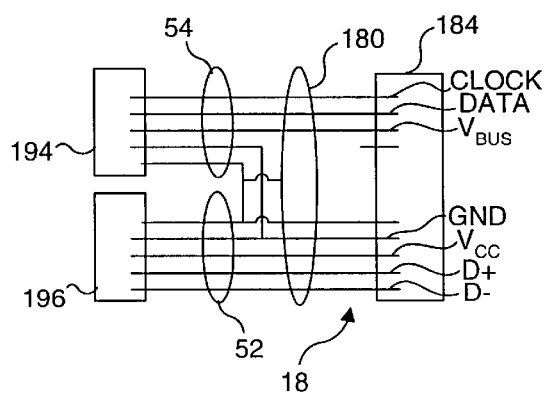
FIG. 4D is an electrical schematic diagram of the electrical circuit of the cable of FIG. 4A.

FIGS. 4A–4D show further details of cable 18 as used in this preferred embodiment. Cable 18 terminates at the keyboard in an internal multi-connector plug 184 to which a plurality of conductors 186 are attached. A shield lead 182 is connected to the chassis (not shown) of keyboard 16. Leads 186 extend from the keyboard through a common section 180 of cable 18 to a Y-fitting 188, which is disposed a few inches from the end of the cable. At Y-fitting 188, cable 18 splits into a USB cable 52 and a PS/2 cable 54. USB cable 52 terminates in a conventional USB plug 196, while PS/2 cable 54 terminates in a conventional PS/2 plug 194. PS/2 plug 194 includes keys 198 for indexing it when it is inserted into the PS/2 port on the PC. USB plug 196 includes a plurality of contacts on a strip 202 within a rectangular barrel 200 and is indexed by a ridge 204 to ensure that it is properly seated within the USB port on the PC. As shown in FIG. 4D, section 180, PS/2 cable 54, and USB cable 52 include common shielding. In addition, PS/2 cable 54 includes CLOCK, DATA, and $V_{BUS}$ signal lines, along with a ground line (GND) that is also common to USB cable 52. USB cable also includes $V_{CC}$ and USB data lines D+ and D−. Each of these signal lines is terminated on internal connector 184.

Figure 2B:
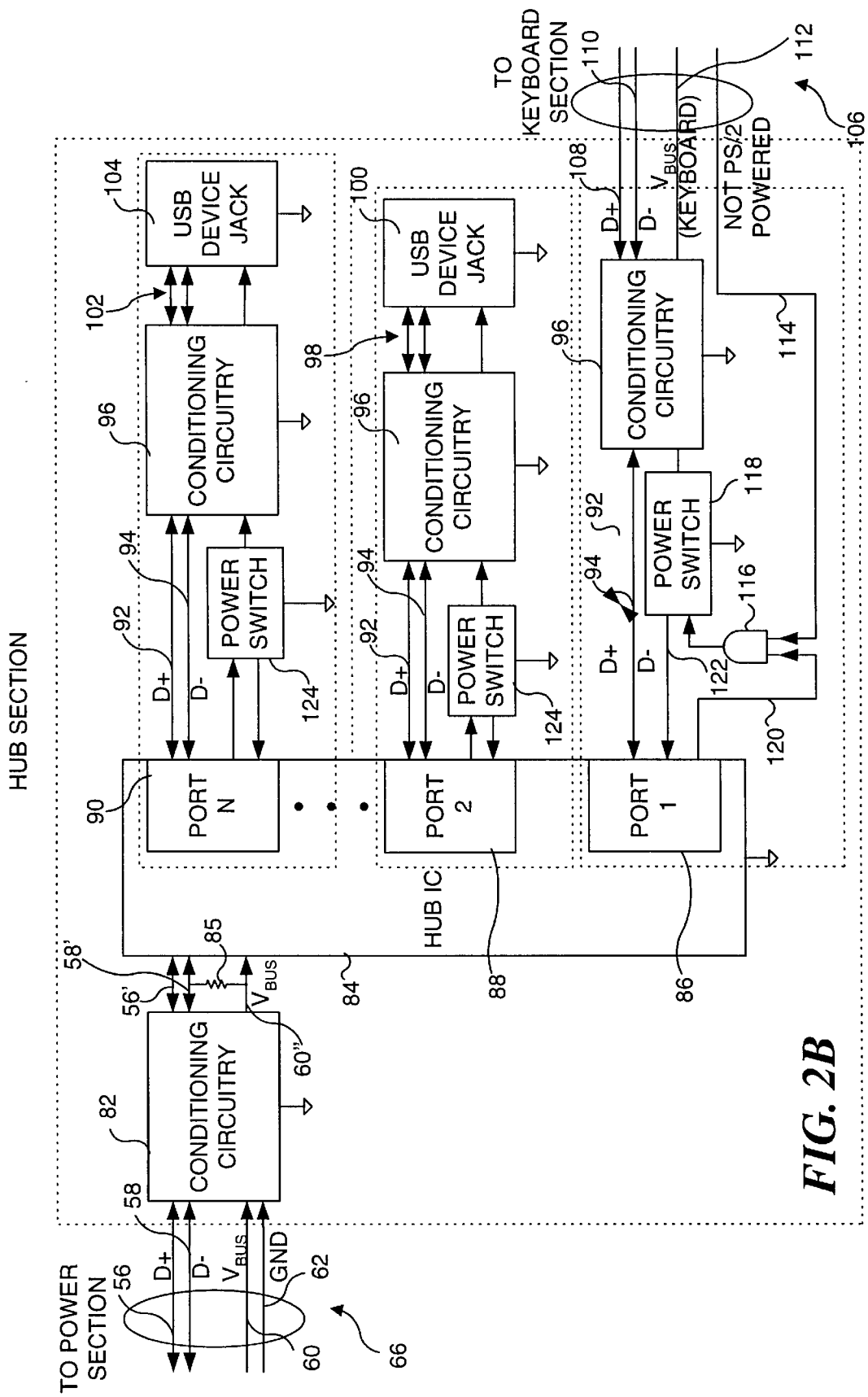
FIG. 2B is a schematic block diagram of a hub section of the USB keyboard shown in FIG. 1.
Figure 2C:
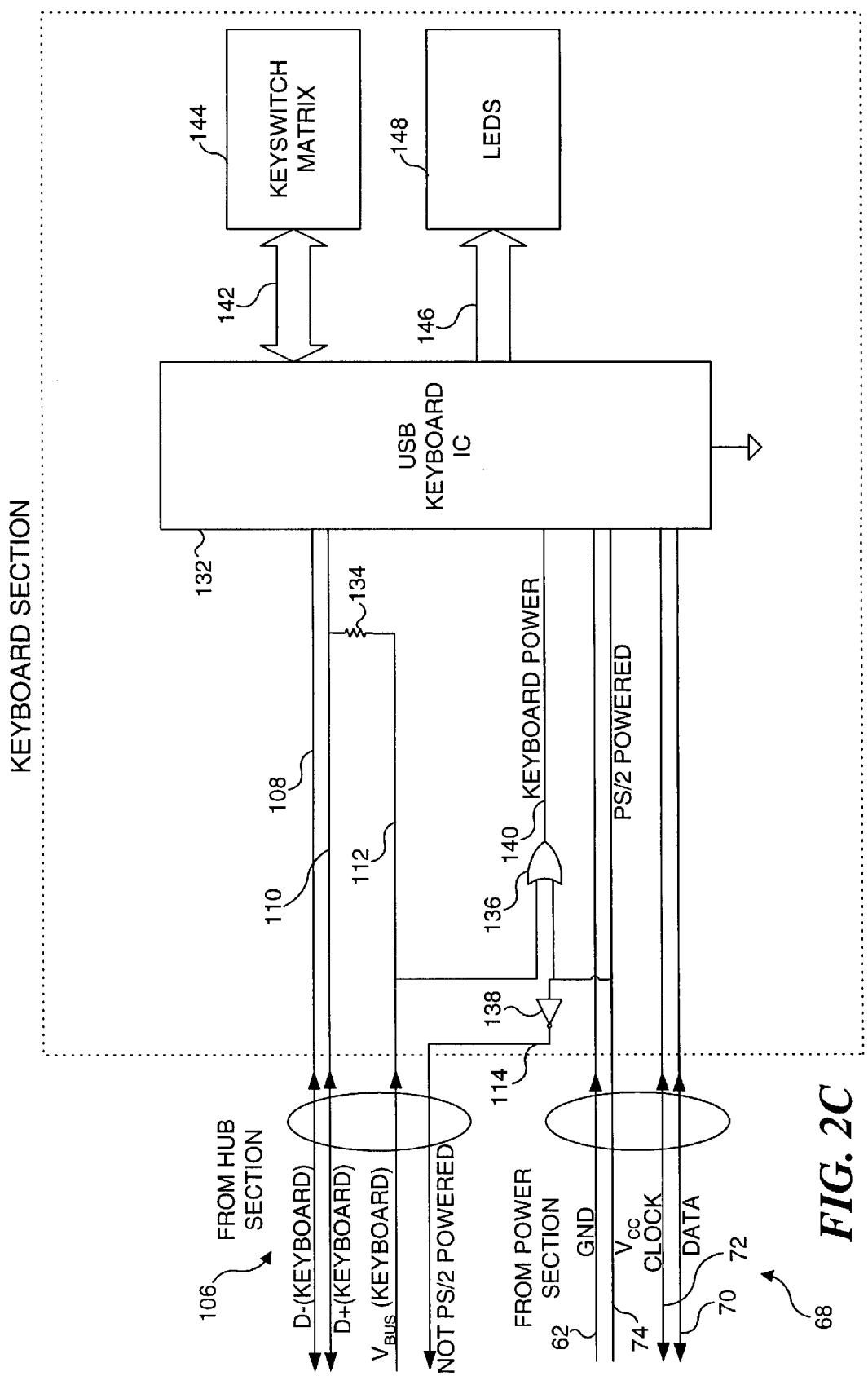
FIG. 2C is a schematic block diagram of a keyboard section of the keyboard shown in FIG. 1.

The circuitry within keyboard 16 is generally divided into a power section 50, which is shown in FIG. 2A, a hub section shown in FIG. 2B, and a keyboard section, which is shown in FIG. 2C. Power section 50 includes a voltage regulator and conditioning block 64 and a signal conditioning block 76. Signal lines extending through USB cable 52 include lines 56 and 58 from the hub section, which are also identified as the USB data lines D+ and D−. Lines 60 and 62, which convey $V_{BUS}$ and the ground (GND) potential, respectively, extend to the hub section from voltage regulator and conditioning block 64. The voltage and ground potential are conveyed from the USB port on the PC (if connected thereto) on lines 60' and 62', respectively.

Within power section 50, signal conditioning block 76 is connected to ground lines 62 and $V_{CC}$, as well as to lines 72 and 70, which are the CLOCK and DATA signals provided from the keyboard section that convey data in the PS/2 format. After passing through the signal conditioning block, the CLOCK and DATA signals are conveyed on leads 72' and 70', respectively, which are connected to the PS/2 port on the PC.

As shown in FIG. 2B, the signal lines and the power lines from the power section (for the USB port) are connected to conditioning circuitry 82. The USB power and USB data signal lines 56 and 58 are identified collectively by reference numeral 66. USB data lines 56 and 58 convey USB data signals bi-directionally between the USB port on the PC and the keyboard. Conditioning circuitry 82 conditions the data and power signals by filtering noise, shaping the signals, and otherwise improving the quality of the signals carried thereon. A line 60" conveys the conditioned VBUS signal to a hub integrated circuit (IC) 84. Similarly, leads 56' and 58' respectively convey the USB data signals D+ and D− to hub IC 84. A resistor 85 connects between lead 60" and lead 58'. Resistor 85 serves to indicate to the host that the Hub IC is connected to the host's USB port in a fashion similar to that of resistor 134, which serves to indicate the presence or absence of the Keyboard IC to the Hub IC.

Hub IC 84 includes a plurality of port sections 86, 88, through 90. Although this preferred embodiment of keyboard 16, which is illustrated in the figures, only includes port section 86 (labeled "Port 1") for the keyboard and additional port sections 2 through N to support the peripheral devices that are connected to the auxiliary USB ports on the keyboard, it will be apparent from the labels identifying the last portion section in the hub IC as "Port N" in the drawings that more or less than two auxiliary USB ports may be provided on the keyboard. USB data lines 92 and 94 connect each port section to a corresponding conditioning circuitry 96. Port section 86 is also connected to a power switch 118 through a lead 122, and the power switch is connected to conditioning circuitry 96. Similarly, the other ports sections 88–90 are each connected to a different power switch 124, and each power switch is connected to its own conditioning circuitry 96. Power switches 124 determine whether USB device jacks 100 and 104 (coupled to port sections 2 through N, where in this embodiment, n equals 3) will be energized with power supplied through the VBUS signal line. USB signals from and to each of USB device jacks 100–104 are conveyed over signal lines 98–102, respectively, are processed by conditioning circuitry 96, and conveyed over signal lines 92 and 94 between the conditioning circuitry and the corresponding port section in hub IC 84.

Port section 86 in hub IC 84 is used for communication of keyboard data to the PC, but only if the PS/2 port on the PC is unavailable, not connected to the keyboard, or inoperative. Power switch 118 enables the application of electrical power to the USB portion of the keyboard section within the keyboard in response to a signal indicating that power is NOT being supplied to the keyboard from the PS/2 port on the PC AND that hub IC 84 is indicating that power should be provided. A line 114 conveys a signal that is high when the keyboard is not receiving electrical power from the PS/2 port on the PC to an AND gate 116. Although a simple AND gate 116 is illustrated, it should be apparent that in reality, a different type of switching element that implements the function of an AND gate is actually employed in this preferred embodiment and not the illustrated simple AND gate. This switching element, which functions as an AND gate, also receives another input signal from port section 86, and this signal is high (logic level one) when power is being provided to hub IC 84 over $V_{BUS}$ signal line 60 from the USB port of the PC and the PC has instructed hub IC 84 to provide power to that port. Thus, power switch 118 closes to provide power to the USB portion of a USB keyboard IC 132 if USB power is available from the USB port on the PC, the PC has instructed the hub IC to provide power to the USB port in the hub IC to which the keyboard IC is attached, and power is not being supplied from the PS/2 port of PC. If all of these conditions are met, power switch 118 enables electrical power to flow through conditioning circuitry 96 to the keyboard section through a line 112, which is labeled "$V_{BUS}$ (Keyboard)." Data lines 108 and 110 carry USB formatted data between USB keyboard IC 132 in the keyboard section and port section 86 in hub IC 84 in the hub section, if power is enabled by power switch 118. However, if the PS/2 port on the PC is supplying power to the keyboard, power switch 118 disables the potential applied on line 112 to USB keyboard IC 132 in the keyboard section, so that virtually all power supplied to keyboard IC 132 is provided by the PS/2 port through line 74 and not by the USB port on the PC. USB lines 108 and 110, and signal lines 112 and 114 are collectively identified by reference number 106 in FIGS. 2B and 2C.

With reference to FIG. 2C, it will be noted that data lines 108 and 110 connect to USB keyboard IC 132. Signal line 112, which conveys the $V_{BUS}$ potential signal is connected through a resistor 134 to the D+data on USB data line 110. The potential conveyed over signal line 112 on the D+line of the USB keyboard IC enables the hub IC to determine that a device is connected to the USB port of the hub IC and resets the keyboard IC if it is using the USB interface to communicate keyboard data to the PC. Lines 68 connect to USB keyboard IC 132 from the power section and include lines 62, 74, 70, and 72. Line 74, which conveys $V_{CC}$ the potential from the PS/2 port on the host or PC is inverted. Again, a simple inverter 138 is illustrated in the Figure, but the inverting function is actually implemented by an alternative circuit element, such as a transistor, or by providing appropriate firmware and an additional pin on the keyboard IC. Thus, when $V_{CC}$ is high, indicating that electrical power is being supplied to the keyboard by the PS/2 port of the PC, the voltage level on signal line 114 is low, which causes the transfer of USB formatted data corresponding to user interaction with the keyboard to be interrupted. The voltage supplied from the PS/2 port on the PC is input to an OR gate 136 (actually, it is input to a circuit element that implements the logical function of an OR gate), along with any voltage on signal line 112, which will be supplied from the USB port on the PC (assuming that the keyboard is connected to an operating USB port on the PC). Thus, either of these USB port or the PS/2 port on the PC is used to provide power to the USB keyboard IC, with preference being given to the PS/2 port, due to the fact that presence of voltage on PS/2 power line 74 will, through gates 138 and 116, cause power switch 118 to remove the voltage on VBUS line 112.

A key switch matrix 144, which includes all of the keys on the keyboard, is connected to USB keyboard IC 132 with a plurality of signal lines 142. USB keyboard IC 132 responds to signals conveyed on signal lines 142 when a user actuates any key on the keyboard, producing either USB formatted data or PS/2 formatted data corresponding to the user's interaction with the keyboard, depending on whether the PS/2 port on the PC is supplying electrical power to the keyboard 16. Only the PS/2 formatted keyboard data are input to the PC if the PS/2 port is available, operative, and connected to keyboard 16; but if not, the USB formatted keyboard data are supplied to the USB port on the PC (if available and connected). A plurality of signal lines 146 convey power to LEDs 148 on the keyboard. These LEDs are indicative of the status of various functions of the host PC, such as the Caps Lock mode or the Number Lock mode being engaged.

It should be emphasized that even though keyboard 16 is connected to the PS/2 port on the PC, so that keyboard data related to operation by the user of the keyboard are transferred to the PC through the PS/2 port, the USB cable from the keyboard should be connected to the PC to enable the peripheral devices (if any) that may be connected to the auxiliary USB ports on the keyboard to communicate with the USB port on the PC through the keyboard. Keyboard 16 thus is able to serve as a USB hub in regard to such USB-capable peripheral devices, while communicating with the PS/2 port on the PC, to convey data to and from the keyboard in respect to its functional operation as a user input device.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. An external user input device adapted to selectively couple and communicate user input data through at least one of a universal serial bus (USB) port and an alternative port of a host computing device, comprising:
   (a) at least one data switch capable of being activated by a user to determine data that are transmitted to a host computing device;
   (b) a power sense circuit that determines whether electrical power is being supplied to the external user input device from an alternative port of a host computing device and produces a signal indicative thereof; and
   (c) a state switch, coupled to the power sense circuit and said at least one data switch, to receive the signal produced thereby, and in response upon detecting a change in state to said signal indicating that an alternative port is supplying the electrical power indicative thereof, enabling the host computing device to receive data transmitted from said at least one data switch through an alternative port, and otherwise enabling the host computing device to receive data transmitted from said at least one data switch through a USB port.

2. The external user input device of claim 1, further comprising a USB hub circuit having at least one auxiliary USB port adapted to connect to a USB peripheral device, said USB hub circuit enabling transfer of data between an external USB peripheral device and the USB port of the host computing device.

3. The external user input device of claim 1, wherein the alternative port comprises a personal system/2 (PS/2) port.

4. The external user input device of claim 1, wherein said at least one data switch comprises a plurality of alphanumeric keys.

5. The external user input device of claim 1, further comprising signal conditioning circuitry that conditions data signals and power signals.

6. The external user input device of claim 1, wherein an alternative port has priority over a USB port of a host computing device, so that the state switch will preferably employ an alternative port of a host computing device for exchanging data, if the signal produced by the power sense circuit indicates that an alternative port is providing electrical current to the external user input device.

7. The external user input device of claim 6, wherein if a host computing device has been receiving data transmitted from said at least one data switch through a USB port, upon detecting a change in state in which electrical power has now available from an alternative port of a host computing device, the signal produced by the power sense circuit changes, causing the state switch to stop a host computing device from receiving the data from said at least one data switch through a USB port, and instead enabling the host computing device to receive said data through an alternative port of the host computing device.

8. The internal user input device of claim 6, wherein if a host computing device has been receiving data transmitted from said at least one data switch through an alternative port, upon detecting a change in state in which electrical power is no longer supplied to the external user input device from an alternative port of a host computing device, the signal produced by the power sense circuit changes, causing the state switch to stop a host computing device from receiving the data from said at least one data switch through an alternative port, and instead enabling a host computing device to receive said data through a USB port.

9. The external user input device of claim 6, further comprising a data format circuit coupled to said at least one data switch and to the state switch, said data format circuit formatting the data determined by said at least one data switch for input to an alternative port of a host computing device if the state switch has enabled the data to be transmitted to an alternative port of a host computing device, and otherwise, formatting said data for input to a USB port of a host computing device.

10. The external user input device of claim 9, further comprising at lease one cable coupled to the data format circuit, and including:
(a) a USB port connector adapted to connect to a USB port on a host computing device; and
(b) an alternative port connector adapted to couple to an alternative port on a host computing device.

11. An external keyboard adapted to couple to a universal serial bus (USB) port on a host computing device, if available, and to a personal system/2 (PS/2) port on the host computing device, if available, comprising:

(a) a plurality of data switches that produce data signals when actuated by a user;
(b) a keyboard circuit that is coupled to the plurality of data switches to receive the data signals, said keyboard circuit being adapted to selectively format the data signals in a USB format and in a PS/2 format;
(c) a power sense circuit that determines whether the external keyboard is coupled to a PS/2 port of a host computing device by sensing an electrical potential supplied from a PS/2 port of a host computing device if the external keyboard is coupled thereto, said power sense circuit produces a signal indicative of whether said electrical potential has been sensed;
(d) a data source switch that is coupled to the external keyboard circuit and to the signal produced by the power sense circuit, said data source switch selectively determining whether the data signals formatted in the USB format and in the PS/2 format are respectively coupled to a USB port and a PS/2 port on a host computing device, as a function of the signal produced by the power sense circuit; and
(e) a hub circuit having an auxiliary port adapted to connect to an external peripheral device, said hub circuit enabling transfer of data between an external peripheral device and the host computing device.

12. The external keyboard of claim 11, wherein the data source switch preferentially selects the data signals in the PS/2 format for input to a PS/2 port on a host computing device if the signal produced by the power sense circuit indicates that the electrical potential is being supplied from a PS/2 port of a host computing device.

13. The external keyboard of claim 11, wherein the data source switch blocks the data signals in the USB format for input to a USB port on a host computing device if the signal produced by the power sense circuit indicates that the electrical potential is being supplied from a PS/2 port of a host computing device.

14. The external keyboard of claim 11, wherein the hub circuit comprises a USB hub circuit that includes a plurality of USB ports, including one USB port that is coupled to the external keyboard circuit to receive the data signals in the USB format, said USB hub circuit being coupled to a USB port of a host computing device, if available, to transfer USB formatted data between the USB hub circuit and a host computing device, the auxiliary port of the hub circuit comprising a USB ports adapted to couple to a USB peripheral device.

15. The external keyboard of claim 11, further comprising conditioning circuitry that conditions electrical current signals and data signals within the external keyboard.

16. The external keyboard of claim 11, further comprising a voltage regulator that regulates an electrical current received from a USB port on a host computing device.

17. The external keyboard of claim 11, further comprising at least one cable coupled to the data format circuit and to:
(a) a USB port connector adapted to connect to a USB port on a host computing device; and
(b) a PS/2 port connector adapted to couple to a PS/2 port on a host computing device.

18. A method for enabling an external user input device to be selectively coupled to communicate data signals produced as a result of user interaction with the external user input device, with either a USB port on a host computing device or an alternative port on the host computing device, comprising the steps of:
(a) providing an external user input device capable of automatically coupling to a host computing device using either of two ports provided on the external user input device, said two ports including the USB port and the alternative port;

(b) sensing whether a preferred one of the USB port and the alternative port is coupled in communication with the external device user input device; and (c) if the preferred one of the USB port and the alternative port on the host computing device is coupled to the external user input device, enabling communication of the data signals between the external user input device and said preferred one of the USB port and the alternative port on a host computing device.

19. The method of claim 18, wherein the step of sensing comprises the steps of detecting a voltage provided by the preferred one of a USB port and an alternative port of a host computing device to the external user input device, and if the voltage is detected enabling the data signals produced by the external user input device to be communicated to a host computing device only through said preferred one of a USB port and an alternative port.

20. The method of claim 18, further comprising the step of providing a plurality of auxiliary USB ports on the external user input device for communicating data in a USB format between at least one USB peripheral device that is connected to one of the plurality of USB ports, and a host computing device.

21. The method of claim 20, further comprising the step of enabling communication of the data between said at least one USB peripheral device and an auxiliary USB port of the hub computing device, even if the data from the external user input device is preferably communicated to an alternative port of a host computing device.

22. The method of claim 18, wherein the preferred one of a USB port and an alternative port of a hub is an alternative port, further comprising the step of disabling the transfer of the data produced as a result of the user interaction with the external user input device to a USB port if an alternative port of a host computing device is coupled in communication with the external user input device, so that said data are communicated only through an alternative port.

23. The method of claim 18, wherein the external user input device comprises a keyboard.

24. The method of claim 18, wherein an alternative port is a personal system/2 (PS/2) port.

25. A external device adapted to selectively couple and communicate data through at least one of a Universal Serial Bus (USB) port and an alternative port of a host computing device, said external device receiving electrical power from the host computing device through at least one of a USB port and an alternative port of the host computing device, comprising:

(a) at least one of a data switch capable of being activated by a user to determine data that are transmitted to a host computing device, and an indicator that indicates a condition of the external device; and (b) circuit means for determining whether electrical power is being supplied to the external device from an alternative port of a host computing device, and for enabling external device data to be transferred through:

(i) an alternative port of a host computing device in response to determining that an alternative port is supplying electrical power to the external device; and (ii) a USB port of a host computing device in response to determining that an alternative port is not supplying electrical power to the external device.

26. The device of claim 25, wherein the circuit means includes a pull up resistor that is disabled by application of electrical power to the device from an alternative port of a host computing device, disablement of the pull up resistor preventing device data from being transferred through a USB port of a host computing device.

27. An external user input device adapted to selectively couple and communicate user input data through at least one of a universal serial bus (USB) port and an alternative port of a host computing device, comprising:

(a) a USB connector adapted to couple to a USB port of a host computing device and to selectively transmit data thereby;

(b) an alternative connector adapted to couple to an alternative port of a host computing device and to selectively transmit data thereby;

(c) at least one data input element, which when activated by a user, produces user input data for transmission to a host computer device;

(d) a power sense circuit coupled to said alternative connector, said power sense circuit determining whether electrical power is being supplied to said external user input device from an alternative port of a host computing device to which said alternative connector is coupled, said power sense circuit producing a signal indicative thereof; and (e) a state switch coupled to said power sense circuit and to said at least one data input element such that said state switch receives said signal produced by said power sense circuit, and in response to said signal, selects one of said USB connector and said alternative connector that said external user input device will employ to transmit said user input data to a host computer device, when said external user input device is coupled to a host computing device using one of said USB connector and said alternative connector.

28. The external user input device of claim 27, wherein said external user input device further comprises at least one input USB port adapted to connect to a USB peripheral device, each input USB port being coupled to said USB connector to form a USB hub circuit, such that peripheral device data from a USB peripheral device connected to any input USB port will be transmitted to a host computing device when said USB connector is coupled to a USB port of that host computing device.

29. The external user input device of claim 27, wherein the alternative connector comprises a personal system/2 (PS/2) connector adapted to couple to a PS/2 port of a host computing device.

30. The external user input device of claim 27, wherein said at least one data input element comprises a plurality of alphanumeric keys.

31. The external user input device of claim 27, wherein when said signal produced by said power sense circuit indicates that electrical power is being supplied to said external user input device from an alternative port of a host computing device to which said alternative connector is coupled, said state switch selects said alternative connector to transmit said external user input data to a host computing device.

32. An external keyboard adapted to couple to one of a universal serial bus (USB) port and a personal system/2 (PS/2) port on a host computing device, comprising:

(a) a USB connector adapted to couple to a USB port of a host computing device and to selectively transmit data to the-host computing device thereby;

(b) a PS/2 connector adapted to couple to a PS/2 port of a host computing device and to selectively transmit data to the host computing device thereby;

(c) a plurality of data switches that produce data signals when actuated by a user;

(d) a keyboard circuit that is coupled to the plurality of data switches to receive the data signals, said keyboard circuit being adapted to selectively format the data signals in a USB format and in a PS/2 format;

(e) a power sense circuit that determines whether the external keyboard is coupled to a PS/2 port of a host computing device by sensing an electrical potential supplied from a PS/2 port of a host computing device if the external keyboard is coupled thereto, said power sense circuit producing a signal indicative of whether said electrical potential has been sensed; and (f) a data source switch that is coupled to the external keyboard circuit to receive the signal produced by the power sense circuit, said data source switch selectively determining whether the data signals formatted in the USB format or in the PS/2 format are transmitted to the host computing device using a corresponding one of the USB connector and the PS/2 connector, as a function of the signal produced by the power sense circuit.

33. A method for enabling a external user input device that includes both a USB connector adapted to couple to a USB port of a host computing device and an alternative data connector adapted to couple to an alternative data port of a host computing device, to selectively determine which of the USB connector and the alternative data connector to utilize to transmit user input data to a host computing device, comprising the steps of:

(a) determining if the alternative data connector is coupled in communication with an alternative data port of a host computing device; and (b) if the alternative data connector is coupled in communication with an alternative data port of a host computing device, enabling communication of the user input data between the external user input device and the host computing device using the alternative data connector, and otherwise, enabling communication of the user input data between the external user input device and the host computing device using the USB connector.

34. The method of claim 33, wherein the step of determining comprises the step of detecting a voltage provided by a host computing device to the alternative data connector.

35. The method of claim 33, further comprising the step of providing a plurality of auxiliary USB ports on the external user input device for communicating peripheral device data in a USB format to a host computing device using the USB connector, when at least one USB peripheral device is connected to one of the plurality of auxiliary USB ports, and the USB connector is coupled to a USB port of a host computing device.

36. The method of claim 33, further comprising the step of providing a hub circuit having an auxiliary Port adapted to connect to an external peripheral device for enabling transfer of data between an external peripheral device and the host computing device.

* * * * *